June 19, 1928.
H. B. SCOTT ET AL
ENGRAVING MACHINE
Filed May 2, 1924
1,674,484
9 Sheets-Sheet 4
FIG. 6
FIG. 26
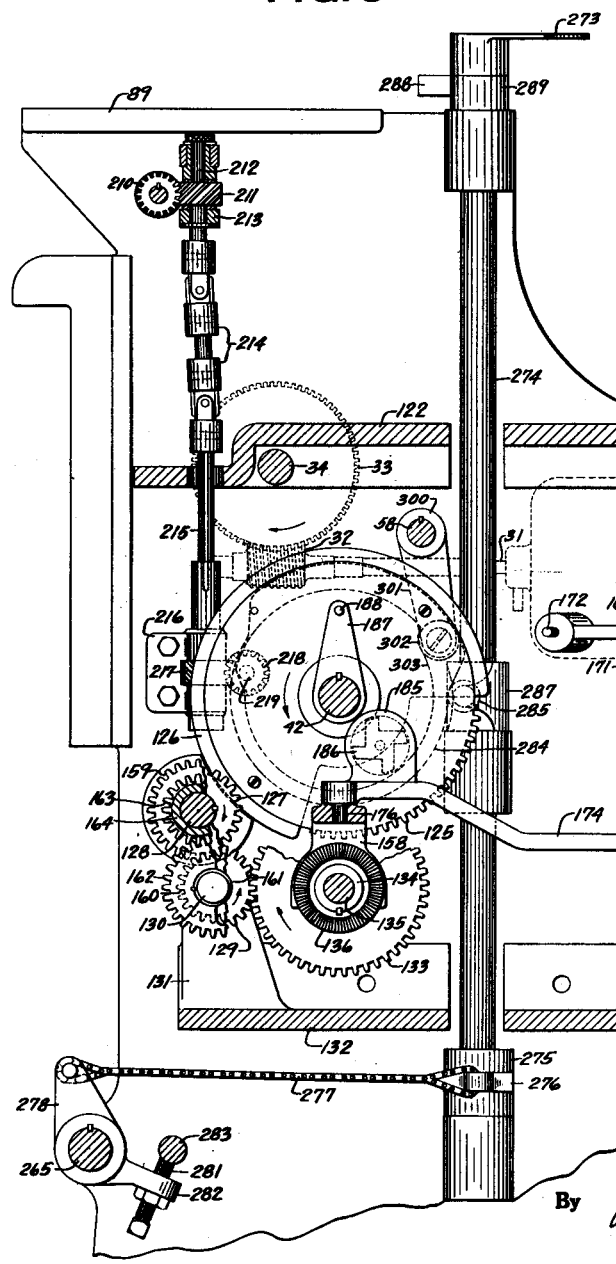
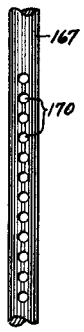
Inventors
Howard B. Scott and
Edgar Warner
By *Carl Beust*
*Henry E. Stauffer*
their Attorneys

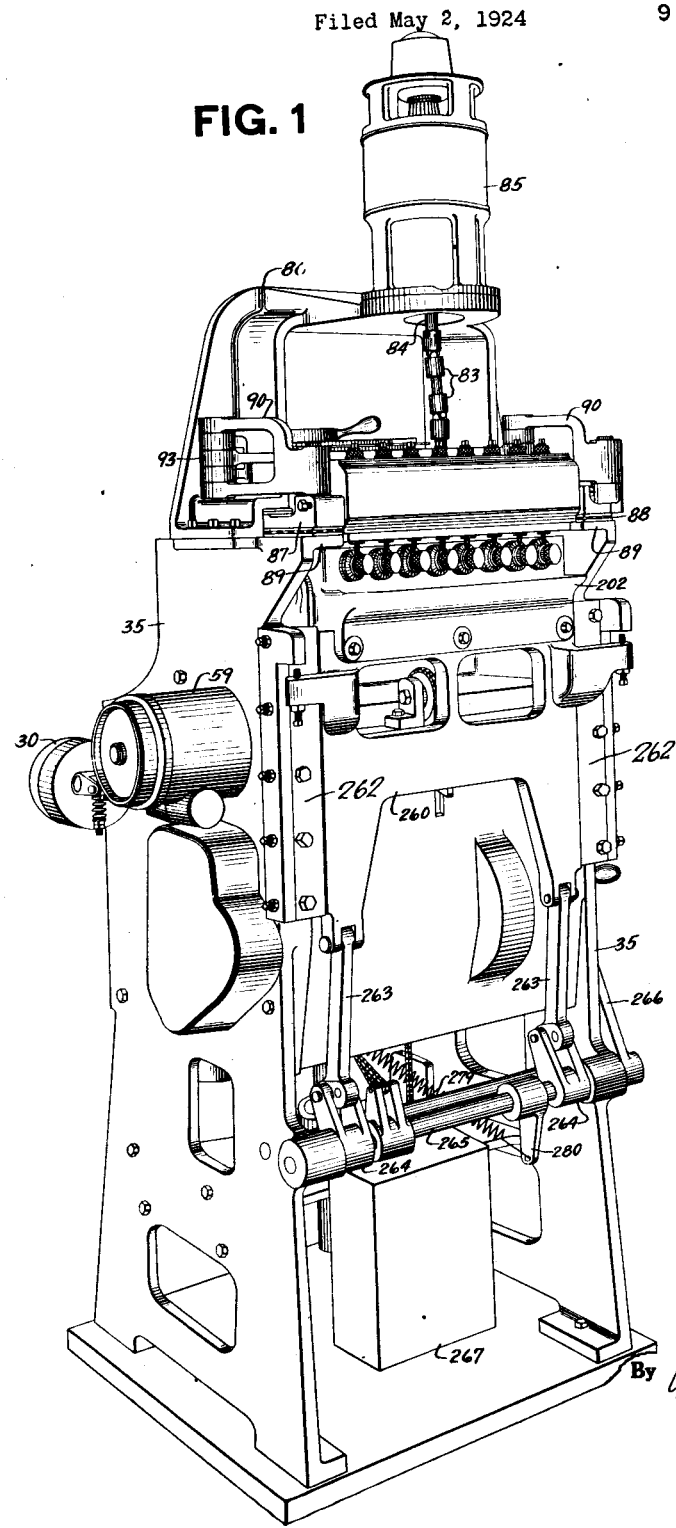

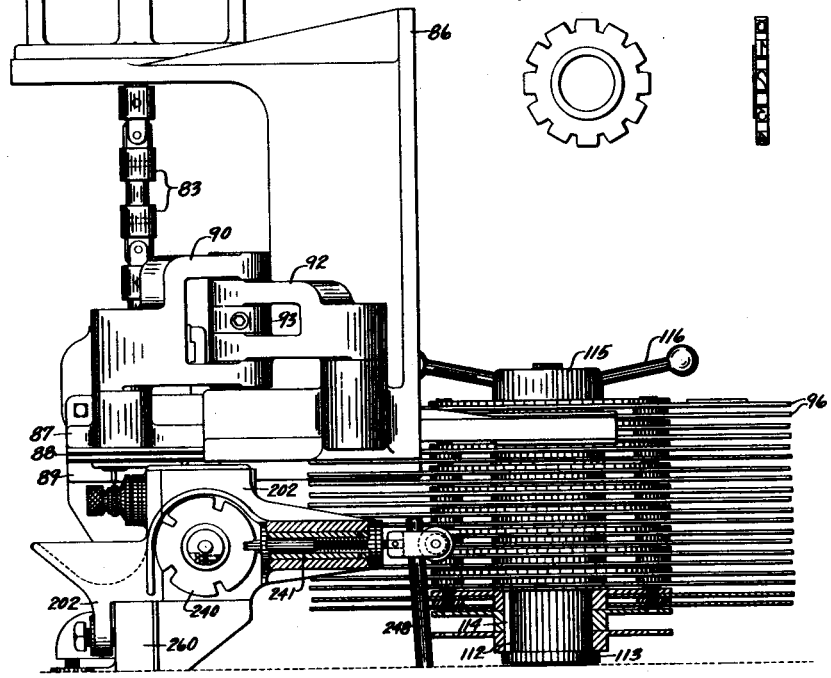

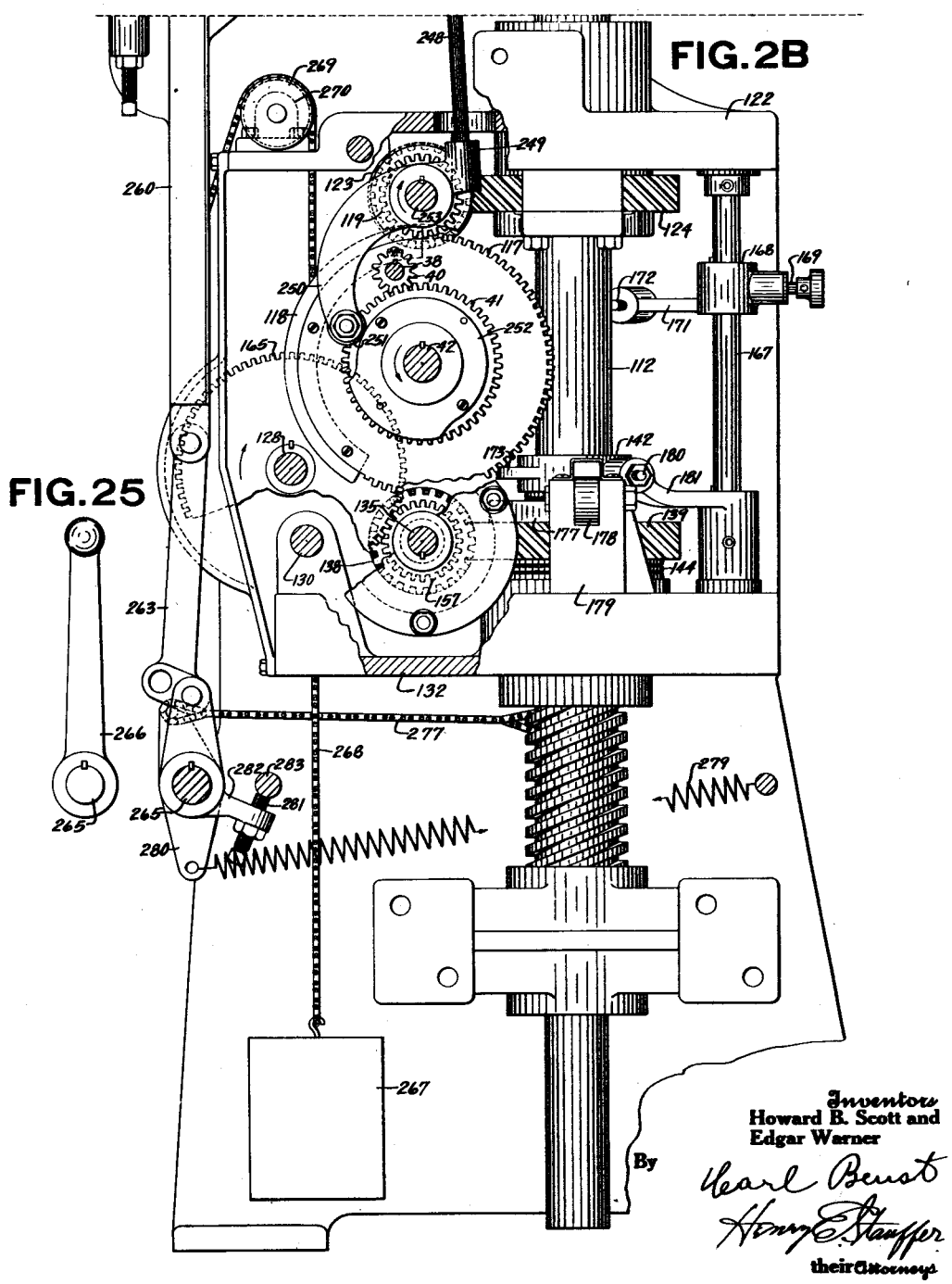

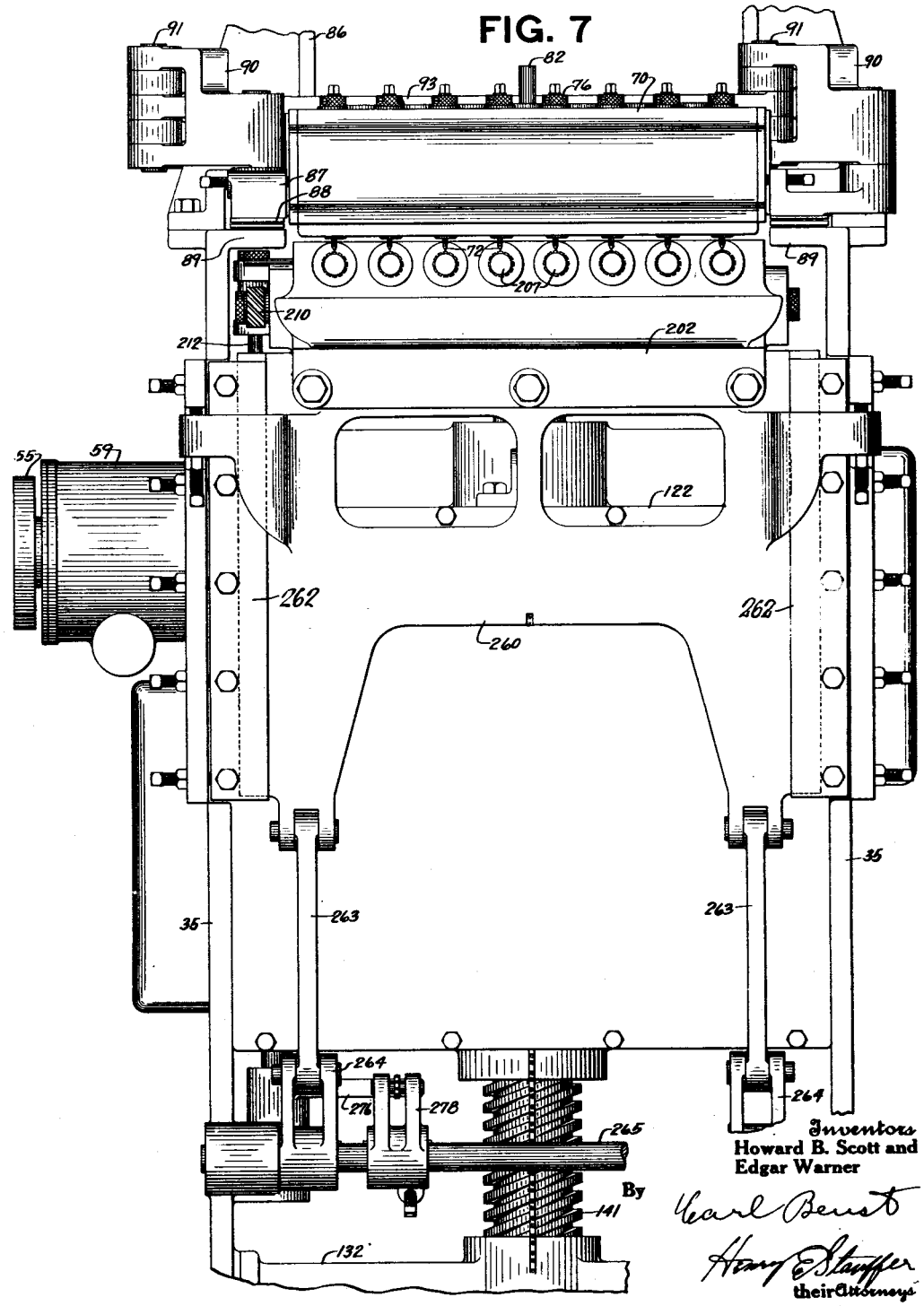

June 19, 1928.
H. B. SCOTT ET AL
ENGRAVING MACHINE
Filed May 2, 1924
FIG. 9     FIG. 10     FIG. 11     FIG. 12
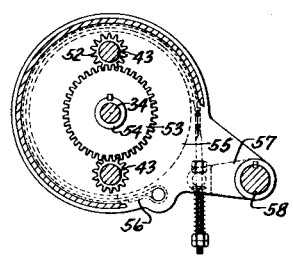
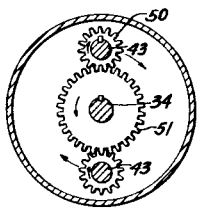
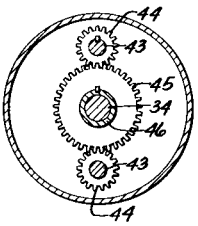
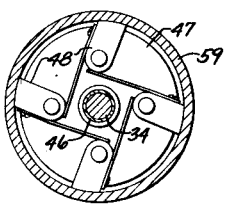
FIG. 8
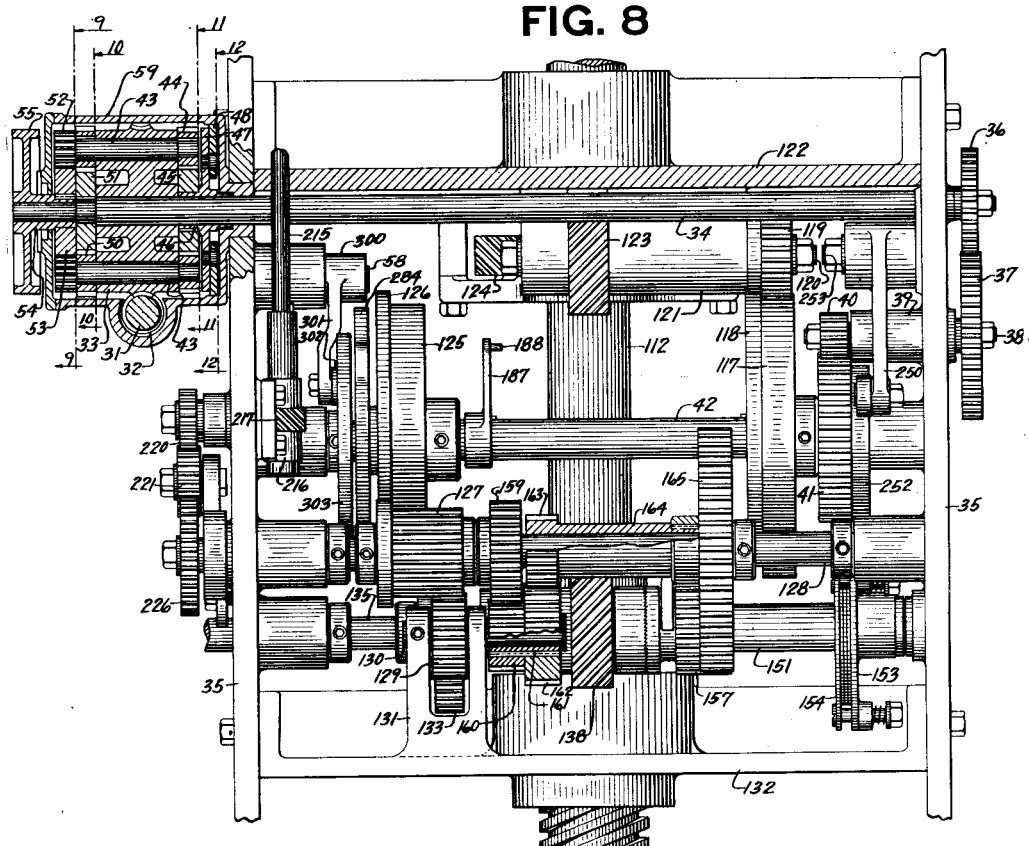
FIG. 13     FIG. 14
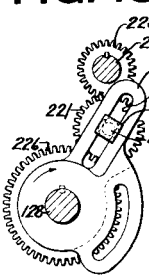
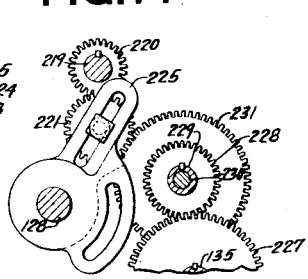
Inventors
Howard B. Scott and
Edgar Warner
By *Carl Benst*
*Henry E. Stauffer*
their Attorneys June 19, 1928.

H. B. SCOTT ET AL 1,674,484

ENGRAVING MACHINE

Filed May 2, 1924

Inventors
Howard B. Scott and
Edgar Warner

By *Carl Benst*

*Harry E. Stauffer* their Attorneys

June 19, 1928.

H. B. SCOTT ET AL 1,674,484

ENGRAVING MACHINE

Filed May 2, 1924

Inventors
Howard B. Scott and
Edgar Warner

By their Attorneys

June 19, 1928.  1,674,484

H. B. SCOTT ET AL

ENGRAVING MACHINE

Filed May 2, 1924  9 Sheets-Sheet 9

Inventors
Howard B. Scott and
Edgar Warner

By their Attorneys

Patented June 19, 1928.

1,674,484

UNITED STATES PATENT OFFICE.

HOWARD B. SCOTT AND EDGAR WARNER, OF DAYTON, OHIO, ASSIGNORS, BY MESNE ASSIGNMENTS, TO THE NATIONAL CASH REGISTER COMPANY, OF DAYTON, OHIO, A CORPORATION OF MARYLAND.

ENGRAVING MACHINE.

Application filed May 2, 1924. Serial No. 710,574.

This invention relates to automatic engraving machines and the like, and is adapted to be controlled by cams such as may be produced by the cam cutting machine described and illustrated in a copending application for Letters Patent of the United States of Howard B. Scott and Edgar Warner, Serial No. 707,140, filed April 17, 1924.

The principal object of this invention is to provide a machine which will simultaneously and automatically engrave any desired character on a plurality of type wheels such as are used in cash registers and like machines.

Another object is to provide such a machine with mechanism which will automatically rotate or index the blank wheels between engraving operations.

Still another object is to so construct the machine that the blank wheel carrying mechanism will be automatically moved out of cooperative relation with the cutters and then returned to its normal position when an interior cut is necessary in the engraving of a character.

Another object of the invention is to provide mechanism for automatically increasing the speed of the driving mechanism during the indexing operation and then decreasing the speed during the engraving operation.

Still another object is to cause the controlling cams to be raised automatically and successively as each character is engraved and then to be lowered to their starting position when the engraving of all the characters is completed.

With these and incidental objects in view, the invention consists of certain novel features of construction and combinations of parts, the essential elements of which are set forth in appended claims and a preferred form of embodiment of which is hereinafter described with reference to the drawings which accompany and form part of this specification.

Of said figures:

Fig. 1 is a perspective view of the complete machine.

Figs. 2^A and 2^B together constitute a right side elevation of the machine taken just inside of the right hand side frame.

Fig. 3 is a detail view of two pairs of the controlling cams and shows how they are mounted.

Fig. 4 is a front view of one of the blank type wheels which the machine is adapted to engrave.

Fig. 5 is a side view of one of the type wheels shown after it has been engraved.

Fig. 6 is a transverse vertical section approximately through the center of the machine looking towards the left.

Fig. 7 is a front elevation of the machine omitting the upper portion and the base.

Fig. 8 is a front view of a part of the machine with the front cover removed to show the driving mechanism.

Fig. 9 is a detail section of the clutch mechanism shown in Fig. 8 being taken on the line 9—9 of said figure.

Fig. 10 is a detail section on line 10—10 of Fig. 8.

Fig. 11 is a detail section on line 11—11 of Fig. 8.

Fig. 12 is a detail section on line 12—12 of Fig. 8.

Fig. 13 is a detail view showing part of the gearing for indexing the type wheels.

Fig. 14 shows a portion of the gearing used when the type wheels are returned to a certain starting point.

Fig. 25 is a detail of the crank handle with which the type wheel carriage may be manually lowered.

Fig. 26 is a detail of the shaft shown just to the left in Fig. 6 and shows the recesses therein for controlling the point at which the cams will be lowered.

Figure 15:
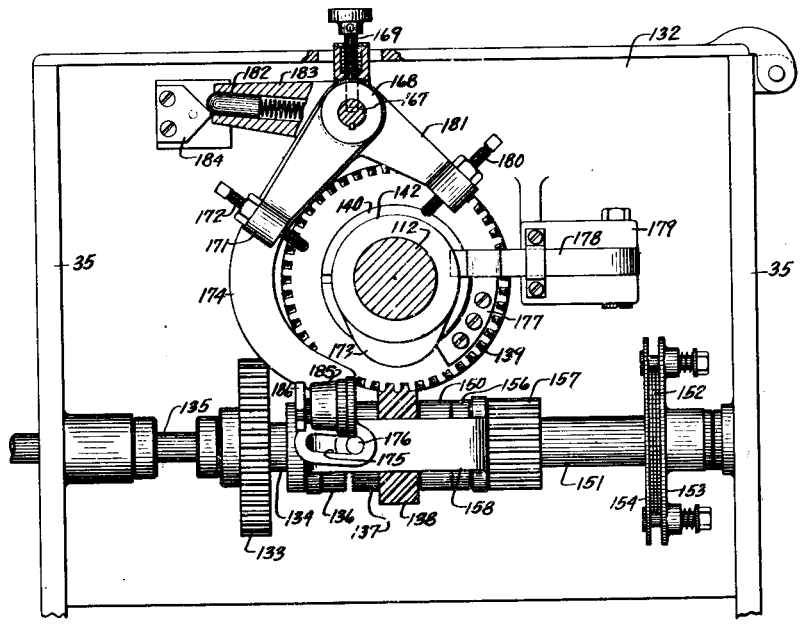
Fig. 15 is a plan view of the mechanism for raising and lowering the controlling cams.

General statement.

The machine shown and described herein is for the purpose of automatically engraving a plurality of type wheels such as are used in cash registers. As shown it is designed to engrave eight wheels simultaneously, but it is evident that a machine could be designed to engrave a greater or smaller number within the scope of this invention.

The blank wheels are each placed on a separate spindle and each has a hole formed therein which cooperates with a locating pin on the spindle.

Appropriate to each type wheel is a cutter which is secured in the lower end of a vertically extending spindle. All of the cutter spindles are supported by a carriage which is mounted for movement in any direction in a horizontal plane. The cutters are rotated at a high rate of speed by suitable gearing driven by an electric motor or any other desired motive power.

Cooperating with the cutter spindle carriage are a plurality of controlling cams, there being a pair of these cams appropriate to each character to be cut. These controlling cams have been previously cut by the machine shown in the copending application above referred to, in accordance with a certain character. One of the cams of each pair controls the forward and rearward movement of the cutter carriage, and the other controls the sidewise movement thereof. When the operation of the machine is begun the top pair of cams is in position to control the movement of the cutter carriage. The cams are slowly rotated about their axis and cause the cutters to move about the blank type wheel and cut the outline of their appropriate character thereon.

If the character is such that an interior cut must be made, mechanism is operated automatically which lowers the type wheel carriage out of engagement with the cutters until the cutters have been positioned to make the interior cut. The carriage is then returned to its cooperative position. When this cut is finished the type wheel carriage is again lowered until the cutters are moved out of line therewith, and then raised to its normal position.

Each pair of cams causes the cutters to make two complete cuts, first, a rough cut which outlines the character, and then a finishing cut.

When one character is completely engraved all of the cams are raised until the next pair is in position to cooperate with the cutter spindle carriage. The rotation of the cams is then recommenced.

During the time when the controlling cams are raised the type wheels are automatically indexed. The carriage carrying them is lowered and, through suitable gearing driven by the main operating mechanism, all of the type wheels are rotated far enough to bring the next blank space thereon into position to be engraved. The carriage is then raised to bring them again into cooperative relation with the cutters.

The movement of the cams while the engraving is being done is very slow. Means is provided however for speeding up the operation of the machine during the indexing movement. This is done automatically through a clutch mechanism which will be described in detail later.

As shown herein the type wheels have twelve blank faces on which engraving may be done. If it is desired to engrave wheels having a smaller number of faces a manually adjustable mechanism is provided for accomplishing this result. Any number of pairs of cams from 1 to 12 can be used. When the lowest pair has operated the cams wil be lowered to their starting position. The gearing which drives the indexing mechanism can be readily changed so that this mechanism will operate properly, if, for instance, a type wheel having only ten spaces is to be engraved.

Main driving mechanism.

As shown herein, the machine is driven by an electric motor 30 (Figs. 1 and 6). This motor rotates a shaft 31 (Figs. 6 and 8) in a clockwise direction, as seen in these figures. Fast on this shaft is a worm 32 which meshes with a worm wheel 33 loosely mounted on a transverse shaft 34 supported by the machine side frames 35. On its right hand end (Fig. 8) is a gear 36 which meshes with a gear 37 fast on a short shaft 38 carried in a bearing 39 cast integral with the right hand side frame. Also fast on this shaft is a pinion 40 which meshes with a gear 41 fast on a shaft 42. This is the main drive shaft of the machine and is rotatably mounted in the side frames 35.

During engraving operations, the shaft 42 is driven quite slowly by means of a planetary gearing mechanism which will now be described. The worm wheel 33 supports two shafts 43 (Figs. 8, 9, 10 and 11) which are diametrically opposite each other. These shafts are identical and each shaft carries a pinion 44 keyed thereto. Both of these pinions mesh with a gear 45 which is keyed to a sleeve 46. Fast on this sleeve is a plate 47 carrying four clutch members 48 which cooperate with the inside of a housing 59 for these parts (Fig. 12). It is evident that the clutch members 48 prevent movement of plate 47, sleeve 46 and gear 45 in a clockwise direction, but permit movement of these parts in a counter-clockwise direction.

The worm wheel 33 is rotated in a clockwise direction (Fig. 11), and as the gear 45 is held against movement in this direction it is evident that the pinions 44 will roll over the teeth of the gear 45 and thereby rotate the shafts 43 in a clockwise direction (Fig. 11).

Also keyed to shafts 43 are pinions 50 (Figs. 8 and 10), both of which mesh with a gear 51 keyed to the shaft 34 above mentioned. The ratio between the pinions 50 and gear 51 is not so great as that between pinions 44 and gear 45. It is evident, therefore, that as the pinions 50 turn an equal distance with the pinions 44, the gear 51 will be rotated counter-clockwise a short distance during each rotation of the worm wheel 33. As this gear 51 is keyed to the shaft 34 this shaft and the main drive shaft 42 will be given a counter-clockwise movement, as seen in Fig. 2ᴮ, which is relatively very slow, as compared with the speed of the worm wheel.

During the indexing operation it is desired to increase the speed of the main drive shaft, and this is done in the following manner. Fast on each of the shafts 43 is a pinion 52 (Figs. 8 and 9). These pinions mesh with a gear 53 keyed to a sleeve 54 loose on shaft 34. A drum 55 is also fast on this sleeve. Surrounding this drum is a brake band 56 (Fig. 9) which is anchored at one end and at its other end is connected to an arm 57 fast on a shaft 58. Adjustable means are provided for taking up the wear of the band. A coil spring surrounds the rod to which the brake band is fastened and prevents the band from dragging, as is well known in such devices.

At the beginning of the indexing operation, the shaft 58 is rocked counter-clockwise (Fig. 9) by mechanism which will be hereinafter described in connection with this operation. This movement will tighten the brake drum sufficiently to prevent any rotation of the drum 55 and therefore the gear 53 which is rigidly connected therewith will also be held stationary. Therefore, as the worm wheel 33 continues its movement the pinions 52 will roll over the periphery of said gear and be rotated thereby in a clockwise direction. The pinions 50 are driven to the same extent as pinions 52, but due to the difference in ratio between pinions 52 and gear 53 and pinions 50 and gear 51, the gear 51 and shafts 34 and 42 will be rotated counter clockwise (Figs. 2ᴮ, 8 and 10) at approximately twice the speed they were driven on engraving operations.

Cutters.

Figure 20:
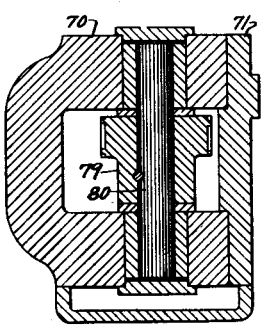
Fig. 20 is a detail section of one of the idle gears used in driving the cutter spindles.
Figure 21:
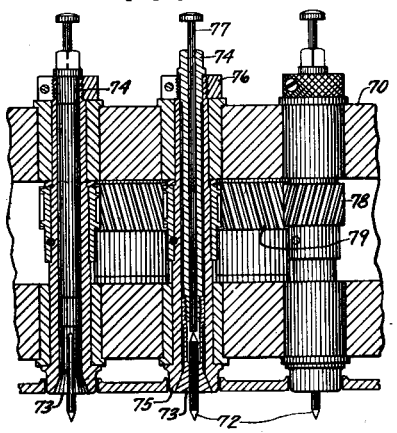
Fig. 21 is a detail view partly in section of the cutter spindles and the driving means therefor.

This machine, as shown herein, is adapted to simultaneously engrave eight type wheels, and therefore eight cutters are provided. All of the cutters are supported in a movable carriage which consists of a U-shaped frame 70 (Figs. 20 and 21) so arranged that the open end is toward the back. A cover-plate 71 is attached to the cutter carriage and completely encloses the cutter driving mechanism. Each cutter 72 (Fig. 21) is inserted in a split collet 73 which at its upper end is threaded and cooperates with a spindle 74 which extends vertically through openings in the U-shaped frame 70. At its lower end the collet is tapered inward and bears against a sleeve 75 which surrounds the spindle. The cutter 72 is inserted in the collet and then the spindle 74 is turned by means of a squared portion at its upper end to draw the collet upward into the tapered portion of the sleeve 75 and lock the cutter in the collet. The spindle is locked to the sleeve 75 by means of a collar 76 located near its upper end. Extending vertically through the center of the spindle is a rod 77 by which the cutter may be adjusted. The collet can be slightly loosened and the rod 77 pushed inwardly until the cutter is in the correct cooperative relation with the blank type wheels, whereupon the spindle is once more tightened in order to lock the cutter in the collet.

Figure 22:
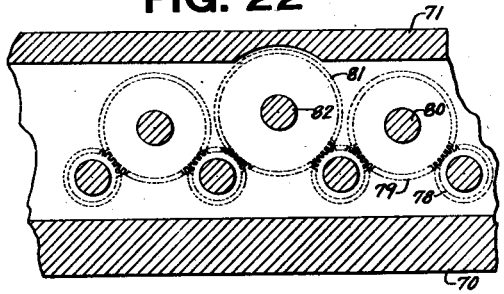
Fig. 22 is a top plan view of the cutter spindles and the driving means therefor.

Pinned to each of the sleeves 75 is a spiral gear 78. These gears are connected by means of idle gears 79 (Figs. 20 and 21), which are pinned to shafts 80 supported by the U-shaped frame 70. Fig. 22 shows the arrangement of the idle gears and the driving gears for the cutter spindles. A gear 81 engages with the two spiral gears for the two center cutter spindles. This gear is fast on a shaft 82 which extends upwardly and is connected by means of two universal joints 83 (Figs. 1 and 2ᴬ) with the armature shaft 84 of a motor 85 which is vertically mounted on a bracket 86 extending upwardly from the side frames of the machine. It is apparent that the rotation of this motor will be transferred through the universal joints 83 to the shaft 82, which will in turn drive all of the cutter spindles through their appropriate idle gears 79.

The cutter carriage proper 70 is secured by four bolts (Fig. 23) to a supporting frame 87 which is movably mounted on ball bearings 88 between this frame and two flattened portions 89 of the side frames 35 (Figs. 1 and 2ᴬ). The frame 87 has two arms 90 pivoted thereto which are formed with U-shaped openings. These arms are connected by pivot pins 91 with corresponding arms 92 pivoted to the machine side frames. A link 93 connects the pivot pins 91 so that the pivotal movement of these arms is identical. It is evident from the above that the cutter carriage may be easily moved in any direction in a horizontal plane due to its flexible mounting.

Controlling cams.

The movement of the cutter carriage is controlled by a plurality of pairs of controlling cams, the peripheries of which have been previously cut, as described in the co-pending application of the present inventors, Serial No. 707,140, filed April 17, 1924, to represent a particular character. The frame 87 for the cutter carriage carries a bracket 94 in which is mounted a roller 95 (Fig. 23) which cooperates with the upper one of a pair of the above mentioned controlling cams 96. The frame 87 also has a bracket extending rearwardly from its right hand side, as viewed in Fig. 23, which carries a roller 97 adapted to cooperate with the lower one of the pair of cams 96. Two powerful coil springs 98 constantly tend to hold the roller 95 against its cam 96, and another spring 99 is stretched between the frame on the left and a pin on the right hand side of the cutter carriage frame and constantly tends to hold the roller 97 in contact with the periphery of the lower controlling cam. It is evident from the above that a high spot on the upper one of the cams will move the cutter carriage forward, whereas a high spot on the lower cam will move the carriage to the right. A low spot on the upper cam will permit the spring 98 to move the carriage rearwardly and a low spot on the lower cam will permit the spring 99 to move the carriage to the left. Therefore the movement of the cutters is directly controlled by the variations of the peripheries of whichever pairs of cams is in cooperative relation therewith.

Approximately the first half of the peripheries of each pair of cams has been previously cut to cause the actuators to make a rough cut on the type wheel blanks. This is done in the manner shown in the above mentioned application of the present inventors. The second half of the peripheries of the cams is designed to cause the actuators to make a close or finishing cut.

Figure 23:
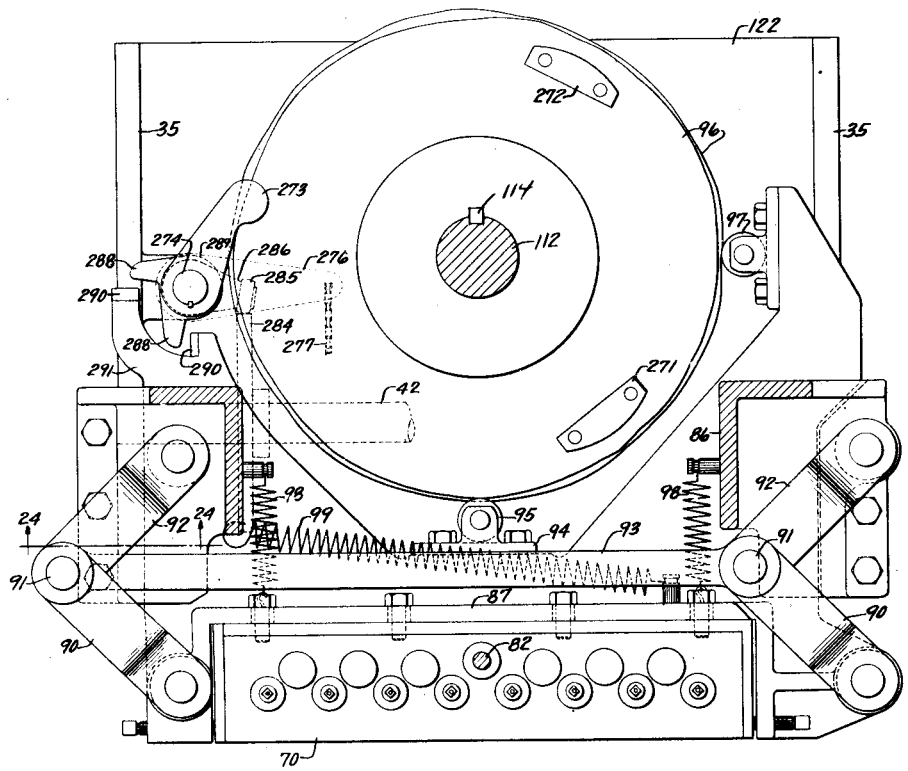
Fig. 23 is a top plan view showing how the movement is transferred from the controlling cams to the cutters for engraving the characters.
Figure 24:
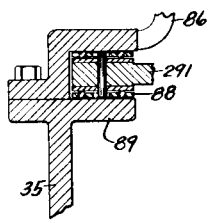
Fig. 24 is a detail section taken on line 24—24 of Fig. 23 and shows one of the roller bearings for the cutter carrying table.

The pairs of cams are fastened together by bolts 110 (Fig. 3), and are properly spaced apart by means of spacing collars 111. All the cams are mounted on the upper end of a vertically extending shaft 112 and they rest on a flange 113 (Fig. 2ᴬ) formed thereon. The cams are adapted to be rotated with the shaft 112 and to accomplish this they are keyed thereto by means of a key 114 (Figs. 3 and 23). After all the cams have been placed on the shaft, a large nut 115 with projecting hand grips 116 is screwed down so as to hold them tightly in position.

Means for rotating the cams.

The shaft 112 and all of the controlling cams are slowly rotated during every engraving operation. The means for rotating the shaft 112 and the controlling cams will now be described. It will be recalled that during the engraving operation the main drive shaft 42 is slowly rotated in a counter-clockwise direction (Fig. 2ᴮ). Fast on this shaft is a large gear 117 which has teeth formed on only a portion of its periphery. On the portion of its periphery on which no teeth are formed there is a segmental plate 118 fastened to the gear 117 for the purpose of preventing any misalinement of the teeth when they come into mesh. The teeth on the gear 117 mesh with a gear 119 (Figs. 2ᴮ and 8), which is keyed to a shaft 120 supported in a bearing 121 extending downwardly from a cross member 122 of the machine frame. This shaft 120 is behind and in axial alignment with the stud 253 as shown in Fig. 2ᴮ. Also fast on the shaft 120 is a spiral gear 123 which meshes with a spiral gear 124. The gear 124 is keyed to the shaft 112 and is adapted to rotate this shaft but not to move vertically therewith.

As shown in Fig. 2ᴮ, the gear 117 is just in position to commence the rotation of the gear 119 and thereby of the shaft 112 and the cams. As the gear 117 revolves in a counter clockwise direction, the teeth thereof will pass out of engagement from the gear 119 and thereby the rotation of the cams will be stopped. The parts are so designed that the cams will receive one complete rotation during the time that the gear 119 is driven by the teeth of the gear 117.

Means for raising the cams between engraving operations.

After the character corresponding to the first pair of cams has been engraved by the cutters as this pair of cams was rotated, it is necessary to raise the next pair of cams into cooperative relation with the cutter carriage, and the means whereby this is accomplished will now be described.

Fast to the main drive shaft 42 is a large mutilated gear 125 (Fig. 6), which is similar in construction to the gear 117 above described, but which has teeth formed on the shorter portion of its periphery. The gear 125 is provided with a guiding plate 126 similar to the plate 118. This gear is rotated in a counter-clockwise direction (Fig.

6), and when it has finished approximately three-fourths of its rotation the teeth formed thereon come into engagement with a gear 127 which is keyed on a shaft 128 supported by the machine side frames. This gear 127 meshes with a gear 129 loose on a shaft 130 supported by an upwardly extending bracket 131 carried by a cross member 132 of the machine frame. The gear 129 meshes with a gear 133 (Figs. 6, 8, 15 and 17) which is fast on a sleeve 134 supported by a shaft 135 extending between the side frames 35 of the machine. Keyed to the sleeve 134 is a clutch member 136 which is adapted to cooperate with a corresponding clutch member 137 formed integral with a spiral gear 138 keyed on the shaft 135. This spiral gear meshes with a spiral gear 139 (Figs. 15 and 16) which is keyed to a sleeve 140. This sleeve 140 has threads formed on its inner surface which cooperate with threads formed on a sleeve 141 surrounding the shaft 112. The shaft 112 has a flange 142 formed thereon which rests on a ball bearing 143, which in turn rests on the upper end of the sleeve 141. The gear 139 is supported by and rotates upon a ball bearing 144 which is supported by a cross member 132 of the frame.

It can be seen from the above that when the teeth of the gear 125 come into cooperative relation with the gear 127, this gear, the gear 129 and the gear 133 will all be rotated during the upward movement of the cams. The clutch member 136 is by means later described, moved into engagement with the clutch member 137 and therefore the rotation of the gear 133 will rotate the spiral gear 138 and spiral gear 139. As the gear 139 is keyed to the sleeve 140, this sleeve will also be rotated, and, due to the teeth formed on its inner surface, the sleeve 141 and shaft 112 will be raised a distance sufficient to bring the next lower pair of cams into cooperative relation with the cutter carriage. When this is accomplished, the teeth of the gear 125 will pass out of engagement with the gear 127 and therefore the upward movement of the cams will stop until the gear 125 makes its next rotation whereupon the same movement of the parts will be repeated.

*Mechanism for lowering cams at the end of the complete operation.*

Figure 17:
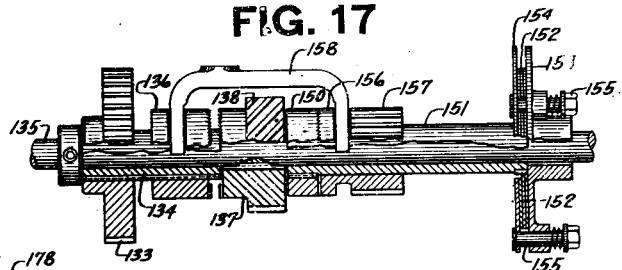
Fig. 17 is a detail view partly in section showing the mechanism for selecting the upward or downward movement of the controlling cams.

When all of the characters have been cut on the type wheels it is desired to lower all of the cams to their original starting point, in which the topmost pair will be in position to control the cutter carriage. In order to accomplish this result, it is necessary to rotate the spiral gears 138 and 139 in the opposite directions from those in which they operated to raise the cams. As can be seen in Fig. 17, there is a clutch member 150 located just to the right of the spiral gear 138. This member is fast on a sleeve 151 surrounding the shaft 135. At its opposite end this sleeve carries a plate 152. Keyed to the shaft 135 is a disk 153 which supports two disks of any suitable material, one on either side of the plate 152. Another plate 154 is supported by bolts 155 carried by the disk 153. Slidably mounted on the sleeve 151 is a clutch member 156 which is integral with a pinion 157. When it is desired to lower the cams, the pinion 157 and clutch member 156 are slid toward the left, into the position shown in Fig. 17, into engagement with the clutch member 150 by means of a yoke 158. As the clutch 156 is engaged with the clutch 150, the clutch 136 is disengaged from the clutch 137. This yoke 158 also cooperates with the clutch member 136 and when the clutch member 156 is moved into engagement the clutch member 136 is moved out of engagement with its corresponding member. The means for operating the yoke 158 will be later described. After the clutch member 156 has moved into engagement with the clutch member 150, the gear 157 is rotated. This will rotate the clutch member 150, the sleeve 151 to which it is keyed, and the plate 152, which is fast on this sleeve, and due to the frictional contact between the plate 152 and the two friction disks on either side thereof, will rotate the disk 153 and shaft 135 which will in turn rotate the spiral gear 138 in the opposite direction to that which it was turned on the cam-raising operation.

The means for driving the gear 157 will now be described. Fast on shaft 128 (Figs. 6 and 8) is a gear 159 which meshes with a gear 160 keyed on a sleeve 161 supported by the short shaft 130 carried by the bracket 131. Pinned to the gear 160 is a gear 162, keyed on sleeve 161. This gear in turn meshes with a gear 163 formed integral with a sleeve 164 surrounding the shaft 128. Keyed to the sleeve 164 is a large gear 165 (Figs. 2ᴮ and 8) which in turn meshes with the gear 157 previously described. It is evident from the above description that when the gear 125 rotates the gear 127 that this movement will be transferred through the gears 159, 160, 162, 163, sleeve 164 and gear 165 to the gear 157, thereby rotating the spiral gear 138 and lowering the cams. This train of gearing is so designed that the movement of the gear 125 will lower all of the cams in the same period of time that was required to raise a single pair of cams.

*Controlling means for raising and lowering cams.*

Figure 16:
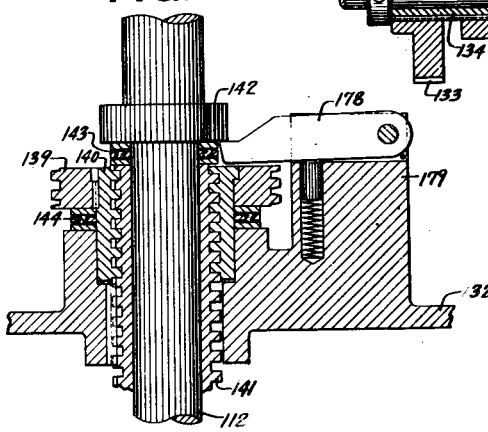
Fig. 16 is a detail sectional view of the mechanism for raising and lowering the shaft which carries the controlling cams.

The machine is designed to cut a type wheel having twelve faces. A wheel having any number of faces from 1 to 12, however may be cut, the usual number being one with ten faces. A manually adjustable mechanism is provided which can be set at any desired position so that the clutch for raising the cams will be disconnected and the clutch for lowering the cams will be connected when the desired number of engraving operations has been effected. This consists of a vertically extending shaft 167 (Figs. 6, 15 and 26) upon which is slidably mounted a hub 168. This hub carries a spring plunger 169 which cooperates with any one of a plurality of holes 170 (Fig. 26) formed in the shaft 167. The hub 168 also has integral therewith an arm 171 carrying a set screw 172 at its outer end which is adapted to cooperate with a cam surface 173 (Fig. 15) formed on the flange 142. Every time the cams are rotated, the cam surface 173 on the flange 142 will also be rotated, and when the lowest pair of cams is moved into position to control the cutter carriage and the cams are rotated during the engraving operation, the cam surface 173 will come into contact with the set screw 172 and will rock the arm 171 and shaft 167 clockwise (Fig. 15). Also fast to the shaft 167 in an arm 174 (Figs. 6 and 15), which has a slot 175 formed therein surrounding a pin 176 projecting upwardly from the yoke 158. It will be recalled that this yoke member cooperates with both the clutch members 136 and 156. It can therefore be seen that when the arm 171 is rocked clockwise by the cam surface 173, the arm 174 will also be rocked clockwise, thereby bringing the end of the slot 175 into engagement with the pin 176 as shown in Fig. 15, and sliding the yoke 158 laterally to the position shown in Fig. 17 which disengages the clutch for raising the cams, and engages the clutch for lowering the cams.

When the last engraving operation has been completed, the gear 125 will operate the parts as above described and will lower the cams to their starting position.

If the type wheels being engraved have less than twelve faces it is evident that as the mechanism is designed to lower twelve cams to a position in which the first pair is ready to commence the next operation, the cams will arrive at their home positions before the lowering mechanism has arrived at its home position. It is therefore necessary to stop the rotation of the spiral gear 139 at this point and permit the driving mechanism therefor to continue its movement to its home position. To accomplish this, a plate 177 is secured to the upper surface of the gear 139. When the cams arrive at their home position, the flange 142 comes into contact with a lever 178 which is pivoted to an upwardly projecting portion 179 of the cross member 132 and rocks this lever down into the path of the plate 177, thereby stopping the gear 139. The driving mechanism, however, through the clutch members 150 and 156 continues its movement until the teeth on the gear 125 pass out of engagement with the gear 127. The shaft 135, and therefore the disk 153, are held stationary and the plate 152 is permitted to slip between the disks on either side of it until the driving mechanism is disconnected. Upon the first subsequent engraving operation, the cam surface 173 comes into contact with a set screw 180 carried by an arm 181 fast on the shaft 167 (Figs. 2ᴬ and 15). The contact of the cam surface 173 with the set screw 180 rocks the arm 181, shaft 167 and arm 174 counterclockwise (Fig. 15) a sufficient distance to bring the opposite end of the slot 175 into engagement with the pin 176 and to move the clutch member 136 into engagement with the clutch member 137 and at the same time to disconnect the clutch member 156 from the clutch member 150. Then when the gear 125 again comes into operative relationship with the gear 127, the parts will be operated, as above described, to raise the same sufficiently to bring the second pair thereof into operative relation with the cutter carriage. The arms 171 and 181 and shaft 167 are flexibly held in one or the other of their two positions by means of a spring plunger 182 carried by a projecting portion 183 of the hub which carries arm 174. The plunger is adapted to lie either on one side or the other of a V-shaped member 184, as shown in Fig. 15.

A mechanism is provided for automatically stopping the machine when the cams are lowered after a complete operation has been accomplished. This consists of a 3-way rotary electric switch of any suitable design, carried in a casing 185 supported on the arm 174 (Figs. 6 and 15). The blade shaft of the switch carries a member 186 having four projections. Fast on the shaft 42 is an arm 187 carrying a pin 188 at its end which will be rotated with the shaft on every operation. On operations where the cams are being lowered, the pin 188 will come into contact with one of the projections of the member 186 and rotate this member far enough to open the switch and thereby stop the driving motor 30. When, however, the cams are being raised and the arm 174 is shifted, the member 186 will be moved out of the path of the pin 188 and therefore the motor circuit will not be broken.

To again start the machine, a usual 3-way electric switch (not shown) is in circuit with the motor 30 an the above described switch.

*Method of mounting and indexing of the typewheels.*

Figure 18:
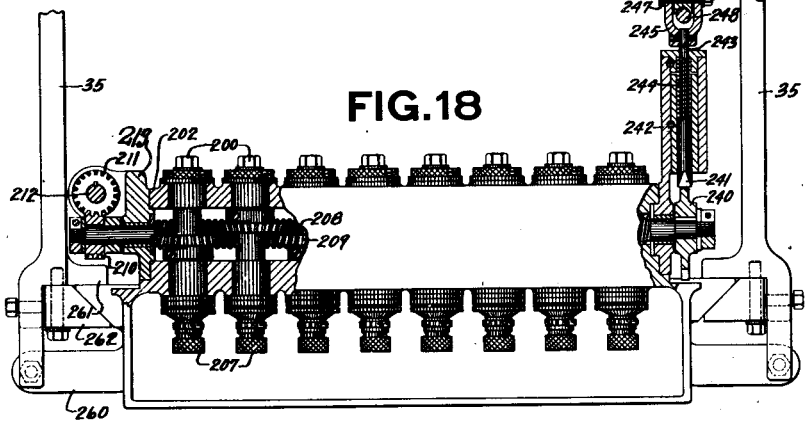
Fig. 18 is a plan view of the table carrying the spindles which support the type wheels, and the means for indexing said type wheels.
Figure 19:
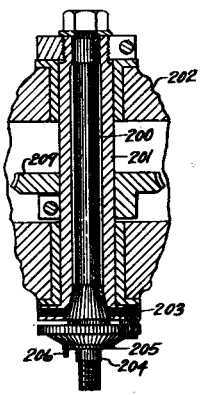
Fig. 19 is a detail sectional view of one of the spindles for carrying the type wheels.

As before noted, the machine as shown herein is designed to simultaneously engrave eight blanks. One of these blanks is shown in Fig. 4. Each of the blanks is placed upon the front end of a horizontal spindle 200 (Figs. 18 and 19) which is supported by a sleeve 201 carried by a casting 202. At its forward end the spindle is rigidly secured to the sleeve by means of a pin 203. The blank type wheel is placed upon a hub 204 against a shoulder 205 and a locating pin 206 carried by said shoulder is inserted in a corresponding hole in the blank. A knurled nut 207 is then screwed down tight on the threaded end of the spindle.

After the character corresponding to the first pair of cams has been engraved on the first face of the blank it is necessary to index all of the blanks, that is, rotate them sufficiently to bring the next blank face into position to be engraved. This is accomplished in the following manner. Extending laterally in an opening in the casting 202 and having bearings in each end thereof is a worm 208. Fast to the sleeve 201 of each of the spindles is a worm wheel 209 (Figs. 18 and 19) which cooperates with the worm 208. It is therefore evident that when the worm is rotated, the spindles and therefore the type wheel blanks will be rotated simultaneously a sufficient distance to bring the next face into position to be engraved.

The mechanism for rotating the worm 208 will now be described. Fast on the left hand end of the worm 208 is a spiral gear 210 which meshes with a spiral gear 211 (Fig. 18) fast on a shaft 212 (Fig. 6) supported by a bracket 213 integral with the casting 202. This shaft 212 is connected by two universal joints 214 to a shaft 215 supported in a bracket 216 secured to the machine side frames 35. Near its lower end the shaft 215 carries a spiral gear 217 meshing with a spiral gear 218 fast on a shaft 219 supported by a projecting portion of the frame 35. The shaft 219 also carries a pinion 220 (Figs. 8, 13 and 14) meshing with a gear 221 which is carried by a stud 222 secured by a nut 223 in a slot 224 of a member 225 which is loose on the shaft 128. The gear 221 meshes with a gear 226 keyed to the shaft 128. It will be recalled that the shaft 128 is rotated in a clockwise direction, as seen in Fig. 13, by means of the gear 125 and gear 127 (Fig. 6). When this rotation of the shaft 128 takes place, the gear 226 will rotate the gear 221 which will in turn rotate gear 220 in a clockwise direction. This movement of the gear 220 through the spiral gear 218, spiral gear 217, shaft 215, universal joints 214, shaft 212, spiral gear 211, and spiral gear 210 will rotate the worm 209 (Fig. 18) a sufficient distance to bring the next blank face of each type wheel into position to be engraved by the cutter upon the next rotation of the cams.

If type wheels having other than ten faces thereon are to be cut, the gear 221 is removed by removing the nut 223 and a gear is inserted in its place which will be of sufficient size to give the proper amount of movement to the type wheels. The member 225 and slot 224 therein are provided so as to give a flexible pivot for the gear 221 so that any sized gear desired may be used.

Under certain conditions in which this machine is used, a type wheel having twelve blank faces is used but only ten of these faces are engraved. It is evident, therefore, that if when the tenth face has been engraved the wheel were to be indexed one space it would leave the mechanism still one space short of its home position in which it is desired to start the operation, due to the position of the locating pin. An alternative mechanism is therefore provided for use in the indexing operation when such a condition as above outlined exists, which will cause the indexing mechanism to be turned backwardly as many spaces as it had been moved forwardly during the engraving operations. In order to accomplish this, the shaft 135 is extended through the left hand side frame (Figs. 8 and 14) and a gear 227 is fastened thereto. This gear is adapted to mesh with a gear 228 keyed on a sleeve 229 carried by a stud 230 supported by the side frame. Also keyed on the sleeve 229 is a gear 231 which meshes with the gear 221, as above described.

It will be recalled that the shaft 135 is rotated first in one direction to raise the cams step by step until the lower-most pair of cams has been operated, and then this shaft is rotated in the opposite direction when the cams are lowered to their starting position. It is therefore evident that through gear 227, gear 228, and gear 231, the gears 221, 220 and shaft 219 will be rotated accordingly, and when the operation of the machine is finally completed, the indexing mechanism will have been returned to its original starting position.

The worm 208 which indexes the type wheel blanks is locked against movement during the engraving operation and is unlocked so that the indexing movement can take place at the end of said engraving operation. The mechanism for accomplishing this function will now be described.

Fast on the right hand end of the worm 208 is a disk 240 (Figs. 2ᴬ and 18). This disk has a plurality of notches cut therein with which a plunger 241 is adapted to engage during the engraving operation. This plunger is slidably mounted in an extension 242 of the casting 202 and has a rearwardly extending rod 243 about which is wound a coil spring 244 which extends between a shoulder on the plunger and the rear end of the extension 242. Pinned to the rear end of the rod 243 is a U-shaped member 245 which carries a roller 246 supported by a pin 247. Cooperating with the roller is the upper end of a rod 248 (Fig. 2ᴮ) which at its lower end is supported by a casting 249 loosely mounted on a stud 253 carried by the side frame 35. The casting 249 has a downwardly extending arm 250 which carries a roller 251 in contact with the periphery of a cam 252 secured to the side of the gear 41. This gear 41 is rotated in a counter-clockwise direction, as above described, and when the high portion of the cam 252 comes into contact with the roller 251, the arm 250, casting 249, and rod 248 will be rocked clockwise about the stud 253, which movement will withdraw the plunger 241 from engagement with one of the notches in the disk 240 thereby compressing the spring 244. As the gear 41 and cam 252 continue their rotation, the roller 251 will pass from the high portion of the cam and the spring 244 will thereupon move the plunger into engagement with the next one of the notches in the disk 240 which has in the meantime been rotated with the worm 208.

*Means for lowering type wheel carriage when an interior cut is to be made.*

When it becomes necessary to cut characters such, for instance, as zeros, which have not only an exterior cut about their outline, but an interior cut as well, which has no opening thereto, it is necessary to lower the type wheel carriage, move the cutters into position to make the interior cut, and then raise the type wheel carriage to bring the wheels once more into operative relation with the cutters. In this machine this operation is accomplished entirely automatically and the mechanism whereby this is done will now be described:

The casting 202 which supports the type wheel spindles is bolted to a vertically movable member 260 (Fig. 1, 2ᴮ, 7 and 18). The sides of the member 260 are tapered and are adapted to slide between projections 261 of the side frames 35 and rails 262 bolted to the side frames, as can best be seen in Fig. 18. Set screws are provided, carried by the machine frame, which cooperate with the sides and top of the member 260 in order to accurately adjust the movement thereof (Fig. 7). At its lower end, the slidable member 260 is attached to two connecting rods 263 (Figs. 1, 2ᴮ and 7) which are in turn pivoted to cranks 264 fast on a shaft 265 supported by the side frames 35. The connecting rods 263 have two holes therein near their lower ends. When the connecting pin is moved from the lower to the upper hole the carriage will be lowered a greater distance thereby permitting larger type wheel blanks to be used. A handle 266 (Fig. 25) is fast on the right hand end of the shaft 265 and may be used when it is desired to lower the type wheel carriage in order to put new blanks in position. When, however, an interior cut is to be made, the shaft 265 is rocked by the machine itself in the following manner. A counterweight 267 (Fig. 2ᴮ) is connected with the member 260 by means of a chain 268 which extends over a pulley 269 supported by a bracket 270 mounted on the cross member 122. This counterweight is of approximately the same weight as the member 260 and therefore but little force is required to move it up and down.

The top one of any of the pairs of cams which represent a figure on which an interior cut is necessary, is provided with two cam plates 271 and 272 (Fig. 23). As the cam rotates, these cam plates will come into engagement with an arm 273 fast on a shaft 274 which extends vertically of the machine. Near its lower end this shaft has a hub 275 (Fig. 6) from which projects an arm 276 which is connected by a chain 277 to an arm 278 fast on the shaft 265.

It can be seen from the above that when the cam plate 271 comes into contact with the arm 273, the shaft 274 and arm 276 will be rocked counter-clockwise (Fig. 23), which will pull the chain 277 toward the rear of the machine and rock the shaft 265 and cranks 264 clockwise thereby, through the connecting rods 263 lowering the member 260 and withdrawing the type wheels from their cooperative relation with the cutters. A powerful spring 279 (Fig. 2ᴮ) connects a downwardly extending arm 280 and a pin on the machine side frame. Therefore as soon as the cam plate 271 passes out of contact from the arm 273 the spring will return the member 260 to its normal upper position. This upward movement is limited by a set screw 281 (Fig. 6) carried by an arm 282 integral with the arm 278. This set screw comes into contact with a shaft 283 supported in the side frames.

During an indexing operation, the cutters are moved to the extreme forward and right hand positions, as viewed in Fig. 23. This is accomplished by the following mechanism. Fast on the shaft 42 is a cam 284 (Figs. 6 and 23) which cooperates with a roller 285 carried by a projection 286 of a hub 287 which is secured to the shaft 274. When the high portion of the cam 284 comes into contact with the roller 285 the shaft 274 will be rocked counter-clockwise (Fig. 23). This movement through the arm 276, chain 277 and arm 278 will rock the shaft 265 and through the above described connections lower the member 260 and the type wheel carriage out of cooperative relation with the cutters. At the same time a hub 289 which carries two arms 288 near the upper end of the shaft 274 comes into contact with lugs 290 formed on a rearwardly projecting portion 291 of the cutter carriage carrying frame 87. The movement of the arms 288 will cause the cutter carriage to move forwardly and to the right to its furthermost position. When the roller 285 passes off of the high portion of the cam 284 the cutter carriage will be permitted to return to a position in which the rollers 95 and 97 are again in engagement with the peripheries of the next pair of cams which has just been raised into operative position and the member 260 will be raised to its normal upper position.

The means for rocking the shaft 58 to tighten the brake band 56 (Fig. 9) and lock the drum 55 during indexing operations will now be described. Keyed to the shaft 58 is a hub 300 (Fig. 6) which has a downwardly projecting arm 301 carrying a roller 302 which cooperates with a cam 303 fast on the shaft 42. It is evident that as the shaft 42 revolves, the high portion of the cam 303 will rock the arm 301 counter-clockwise (Fig. 6) and thereby, through the arm 57 tighten the brake band 56 and stop the rotation of the drum 55, as already described.

While the form of mechanism herein shown and described is admirably adapted to fulfill the objects primarily stated, it is to be understood that it is not intended to confine the invention to the one form of embodiment herein disclosed, for it is susceptible of embodiment in various forms, all coming within the scope of the claims which follow.

What is claimed is:

1. In an engraving machine, the combination of a cutter, a movable carriage for holding said cutter, a plurality of pairs of rotatable cams for controlling the movement of said carriage, and means for moving said pairs of cams into and out of operative relation with said carriage.

2. In an engraving machine, the combination of a movable carriage, a plurality of pairs of rotatable cams for controlling movement of said carriage, and means for moving said pairs of cams successively into and out of operative relation with said carriage.

3. In an engraving machine, the combination of a cutter, a horizontally movable carriage for holding said cutter, a plurality of pairs of rotatable cams for controlling the horizontal movement of said carriage, means for raising said pairs of cams successively and intermittently into and out of operative relation with said carriage, and means for giving all of said cams a complete rotation between successive raising operations.

4. In an engraving machine, the combination of a cutter, a movable carriage for holding said cutter, a plurality of pairs of rotatable cams for controlling the movement of said carriage, means for moving said pairs of cams successively into cooperative relation with said carriage, and means for returning all of said cams to their original positions at the end of the operation.

5. In an engraving machine, the combination of a cutter, a movable carriage for holding said cutter, a plurality of pairs of rotatable cams for controlling the movement of said carriage, means for raising said pairs of cams into cooperative relation with said carriage, and means for returning all of said cams to their lowermost positions at the end of the operation.

6. In an engraving machine, the combination of a cutter, a horizontally movable carriage for holding said cutter, a plurality of pairs of rotatable cams for controlling the horizontal movement of said carriage, means for raising said pairs of cams successively into cooperative relation with said carriage, means for returning all of said cams to their lowermost positions, and means actuated by said lowering means for stopping the machine when the cams have arrived at their lowermost positions.

7. In an engraving machine, the combination of a cutter, a horizontally movable carriage for holding said cutter, a plurality of pairs of rotatable cams for controlling the horizontal movement of said carriage, means for raising said pairs of cams successively into cooperative relation with said carriage, and means for reversing the direction of movement of said raising means to lower said cams to their starting point.

8. In an engraving machine, the combination of a cutter, a horizontally movable carriage for holding said cutter, a plurality of pairs of rotatable cams for controlling the horizontal movement of said carriage, means for raising said pairs of cams successively into cooperative relation with said carriage, means for reversing the direction of movement of said raising means to lower said cams to their starting point, and means for predetermining the point at which the reversing means will operate.

9. In a machine of the class described, the combination of a plurality of cutters, a movable carriage therefor, a plurality of cams for controlling the movement of said carriage, and means for automatically moving said cams into and out of operative relation with said carriage.

10. In a machine of the class described, the combination of a plurality of cutters, a movable carriage therefor, a plurality of pairs of cams adapted to control the movement of said carriage, and means for automatically changing the operative relation between said cams and said carriage.

11. In a machine of the class described, the combination of a plurality of cutters, a movable carriage therefor, a plurality of pairs of cams adapted to control the movement of said carriage, and automatic means for raising and lowering said cams bodily with respect to said carriage.

12. In a machine of the class described, the combination of a plurality of cutters, a movable carriage therefor, a plurality of pairs of cams adapted to control the movement of said carriage, automatic means for raising said pairs of cams successively with respect to said carriage, and means for automatically rotating said cams in the intervals between their upward movements.

13. In a machine of the class described, the combination of a plurality of cutters, a horizontally movable carriage for holding said cutters, a plurality of pairs of rotatable cams for controlling the horizontal movement of said carriage, automatic means for raising said pairs of cams successively and intermittently into and out of operative relation with said carriage, and means for giving all of said cams a complete rotation between successive raising operations.

14. In an engraving machine, the combination of a plurality of cutters, a carriage therefor, a plurality of pairs of cams adapted to control the movement of said carriage, a shaft carrying all of said cams, and means for raising said shaft step by step to bring said pairs of cams successively into operative relation with said carriage.

15. In an engraving machine, the combination of a plurality of cutters, a carriage therefor, a plurality of pairs of cams adapted to control the movement of said carriage, a shaft carrying all of said cams, means for raising said shaft step by step to bring said pairs of cams successively into operative relation with said carriage, and means for giving said shaft and cams one complete rotation between successive raising movements.

16. In an engraving machine, the combination of a plurality of cutters, a carriage therefor a plurality of pairs of cams adapted to control the movement of said carriage, a shaft carrying all of said cams, a flange formed on said shaft, a sleeve surrounding said shaft and bearing against said flange said sleeve having threads formed thereon, a second sleeve having threads cooperating with said first mentioned sleeve, and means for rotating said last mentioned sleeve to raise said shaft and cams.

17. In an engraving machine, the combination of a plurality of cutters, a carriage therefor, a plurality of pairs of cams adapted to control the movement of said carriage, a shaft carrying all of said cams, a flange formed on said shaft, a sleeve surrounding said shaft and bearing against said flange said sleeve having threads formed thereon, a second sleeve having threads cooperating with said first mentioned sleeve, means for rotating said last mentioned sleeve to raise said shaft and cams, a gear secured to said last mentioned sleeve, and means for rotating said gear to raise said cams.

18. In an engraving machine, the combination of a plurality of cutters, a carriage therefor, a plurality of pairs of cams adapted to control the movement of said carriage, a shaft carrying all of said cams, a flange formed on said shaft, a sleeve surrounding said shaft and bearing against said flange said sleeve having threads formed thereon, a second sleeve having threads cooperating with said first mentioned sleeve, a gear secured to said last mentioned sleeve, and intermittently operated means for rotating said gear to raise said cams.

19. In an engraving machine, the combination of a plurality of cutters, a carriage therefor, a plurality of pairs of cams adapted to control the movement of said carriage, a shaft carrying all of said cams, a flange formed on said shaft, a sleeve surrounding said shaft and bearing against said flange, said sleeve having threads formed thereon, a second sleeve having threads cooperating with said first mentioned sleeve, means for rotating said last mentioned sleeve to raise said shaft and cams, a gear secured to said last mentioned sleeve, a mutilated gear, and means for connecting said mutilated gear to said first mentioned gear in order to rotate it and thereby raise said cams step by step.

20. In an engraving machine, the combination of a plurality of cutters, a carriage therefor, a plurality of pairs of cams adapted to control the movement of said carriage, a shaft carrying all of said cams, a flange formed on said shaft, a sleeve surrounding said shaft and bearing against said flange said sleeve having threads formed thereon, a second sleeve having threads cooperating with said first mentioned sleeve, a gear secured to said last mentioned sleeve, a mutilated gear, means for connecting said mutilated gear to said first mentioned gear in order to rotate it and thereby raise said cams step by step, and means for reversing the action of said raising mechanism at a certain point in the operation.

21. In an engraving machine, the combination of a movable cutter carriage, a plurality of pairs of cams adapted to control the movement thereof, a vertically mounted shaft carrying all of said cams, a driving shaft having a continuous rotation, a mutilated gear fast on said driving shaft, and connections between said gear and said vertically mounted shaft for rotating said shaft during the operation of said gear to cause one pair of said cams to operate said cutter carriage.

22. In an engraving machine, the combination of a movable cutter carriage, a plurality of pairs of cams adapted to control the movement thereof, a vertically mounted shaft carrying all of said cams, a driving shaft having a continuous rotation, a mutilated gear fast on said driving shaft, connections between said gear and said vertically mounted shaft for rotating said shaft during the operation of said gear, and another mutilated gear adapted to operate when said first mentioned gear is inoperative for the purpose of raising said shaft and cams to bring the next lower pair of said cams into operative position.

23. In a machine of the class described, the combination of a movable cutter carriage, a plurality of pairs of cams for controlling said carriage, a shaft carrying all of said cams, a spiral gear for raising or lowering said shaft, a stationary double clutch member secured to said gear, two movable clutch members either one or the other of which is normally in engagement with said stationary clutch member, and means for raising or lowering said cams through the appropriate clutch members.

24. In a machine of the class described, the combination of a movable cutter carriage, a plurality of pairs of cams for controlling said carriage, a shaft carrying all of said cams, a spiral gear for raising or lowering said shaft, a stationary double clutch member secured to said gear, driving means, a slidable clutch member operated by said driving means and when in engagement with said stationary clutch adapted to raise said cams, a second slidable clutch member adapted when in engagement with said stationary member to lower said cams, and means for automatically shifting said clutch members to reverse the engagement thereof with said stationary clutch member.

25. In a machine of the class described, the combination of a movable cutter carriage, a plurality of pairs of cams for controlling said carriage, a shaft carrying all of said cams, a spiral gear for raising or lowering said shaft, a stationary double clutch member secured to said gear, driving means, a slidable clutch member operated by said driving means and when in engagement with said stationary clutch adapted to raise said cams, a second slidable clutch member adapted when in engagement with said stationary member to lower said cams, means for automatically shifting said clutch members to reverse the engagement thereof with said stationary clutch member, and manually set means for controlling the point at which said shifting movement will take place.

26. In a machine of the class described, the combination of a movable cutter carriage, a plurality of pairs of cams for controlling said carriage, a shaft carrying all of said cams, a spiral gear for raising or lowering said shaft, a stationary double clutch member secured to said gear, driving means, a slidable clutch member operated by said driving means and when in engagement with said stationary clutch adapted to raise said cams, a second slidable clutch member adapted when in engagement with said stationary clutch to lower said cams, an additional cam formed integral with said shaft, and connections between said shaft and said shiftable clutch members whereby said cam will shift said members to reverse the engagement thereof.

27. In a machine of the class described, the combination of a movable cutter carriage, a plurality of cams for controlling said carriage, a shaft carrying said cams, driving means, a shiftable clutch mechanism driven thereby adapted either to raise or lower said shaft, a cam formed integral with said shaft, an arm adapted to be rocked by said cam, and means operated by said arm for shifting said clutch to reverse the direction of vertical movement of said shaft.

28. In a machine of the class described, the combination of a movable cutter carriage, a plurality of cams for controlling said carriage, a shaft carrying said cams, driving means, a shiftable clutch mechanism driven thereby adapted either to raise or lower said shaft, a cam formed integral with said shaft, an arm adapted to be rocked by said cam, a shaft carrying said arm, and means also carried by said shaft for shifting said clutch to reverse the direction of vertical movement of said shaft when said last mentioned cam comes into contact with said arm.

29. In a machine of the class described, the combination of a movable cutter carriage, a plurality of cams for controlling said carriage, a shaft carrying said cams, driving means, a shiftable clutch mechanism driven thereby adapted either to raise or lower said shaft, a cam formed integral with said shaft, a vertically extending shaft adjacent said first mentioned shaft, two arms fast on said second mentioned shaft so positioned that they will cooperate with said cam at its uppermost and lowermost positions, and a member fast to said second mentioned shaft so arranged that it will shift said clutches back and forth when the arms on said second mentioned shaft are actuated by said cam.

30. In an engraving machine, the combination of a movable carriage, a plurality of spindles carried thereby each adapted to hold a blank type wheel, a plurality of cutters adapted to engrave said type wheels simultaneously, and a plurality of pairs of cams and members operating in timed relation thereto for controlling the movement of said cutters and said type wheels to produce any desired character.

31. In an engraving machine, the combination of a movable carriage, a plurality of spindles carried thereby each adapted to hold a blank type wheel, a plurality of cutters for automatically engraving the same character on said type wheels simultaneously, and means for automatically withdrawing said type wheel carriage from cooperative relation with said cutters on certain operations.

32. In a machine of the class described, the combination of a vertically slidable carriage, a plurality of spindles carried thereby each adapted to hold a blank type wheel, a plurality of cutters for automatically engraving the same character on said type wheels simultaneously, and means for automatically moving said type wheel carriage into and out of cooperative relation with said cutters at any desired point in the operation.

33. In a machine of the class described, the combination of a movable carriage, a plurality of spindles rotatably mounted therein and each adapted to carry a type wheel blank having a plurality of faces, and automatic means for giving all of said spindles a rotary step-by-step movement.

34. In a machine of the class described, the combination of a movable carriage, a plurality of spindles rotatably mounted therein and each adapted to carry a type wheel blank having a plurality of faces, a plurality of cutters adapted to engrave a character on each of said faces, means for rotating all of said spindles one step between engraving operations, and automatic means for turning said spindles backwards the number of steps they have moved forwardly at the end of the complete operation.

35. In a machine of the class described, the combination of a movable carriage, a plurality of spindles rotatably mounted therein and each adapted to carry a type wheel blank, a worm wheel fast to each of said spindles, a worm cooperating with all of said worm wheels to rotate said spindles simultaneously, a locking plate fast on said worm and having a plurality of notches formed therein, a spring plunger adapted to engage in one of said notches and prevent the rotation of said worm, and means for automatically withdrawing said plunger from said notch during a certain portion of the operation of the machine.

36. In an engraving machine, the combination of a plurality of cutters, a carriage for supporting said cutters, a plurality of work carrying members, a carriage therefor, and a plurality of pairs of cams for causing said cutter carriage to move in a manner which will engrave a series of characters on said work.

37. In an engraving machine, the combination of a plurality of cutters, a carriage for supporting said cutters, a plurality of work carrying members, a carriage therefor, and a plurality of pairs of cams each of which will control the movement of both of said carriages in such a way as to engrave a particular character on said work.

In testimony whereof we affix our signatures.

HOWARD B. SCOTT.
EDGAR WARNER.